Sept. 6, 1932. A. B. MODINE 1,875,637
AUTOMOBILE HEATING AND VENTILATING APPARATUS
Filed Feb. 23, 1929 2 Sheets-Sheet 2
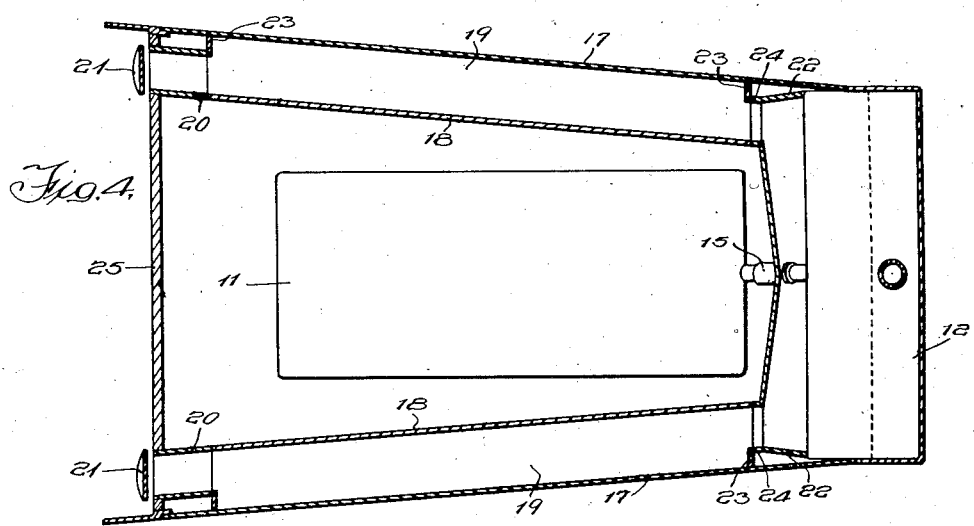
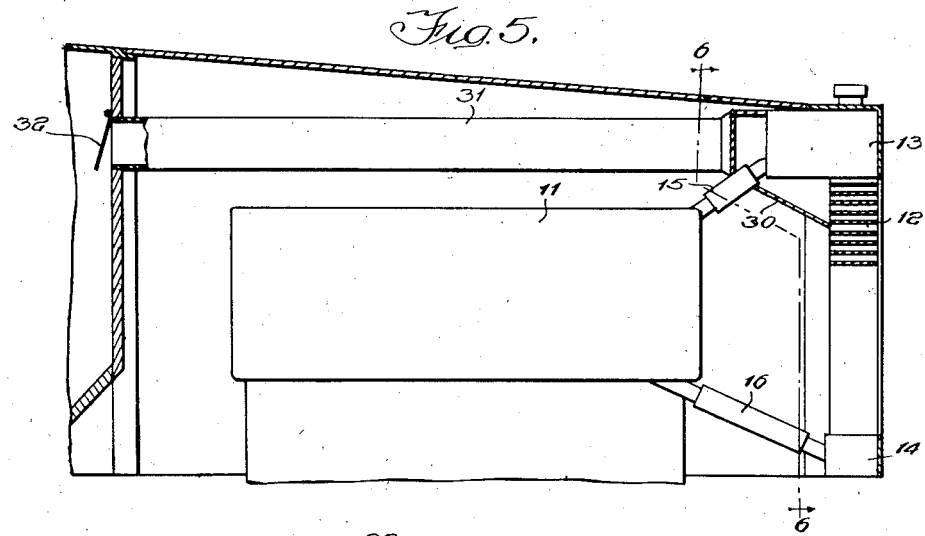
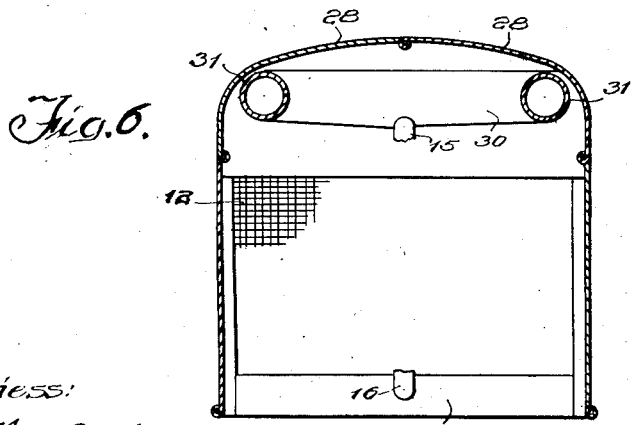
Witness:
William P. Kilroy
Inventor:
Arthur B. Modine
Hill & Hill
By
Attys Patented Sept. 6, 1932

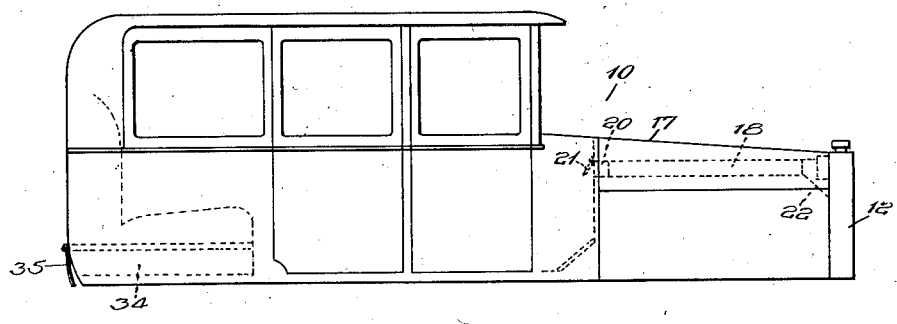
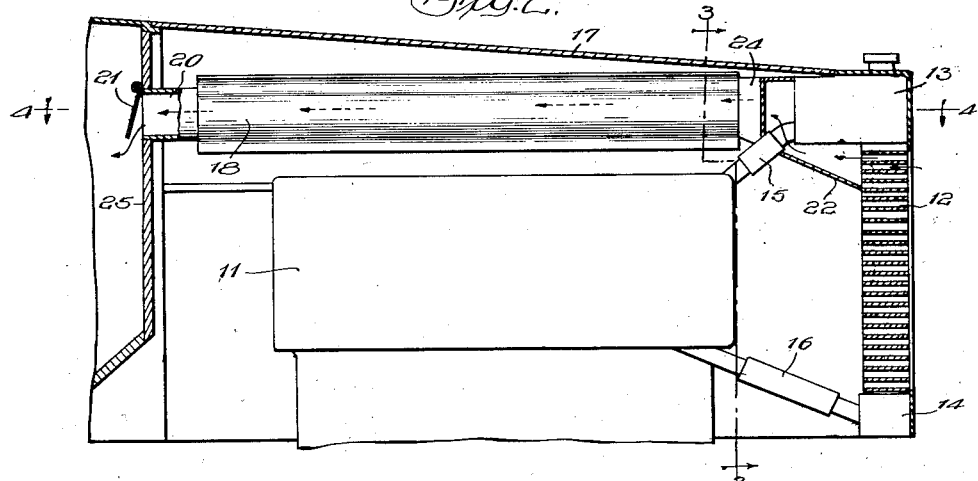
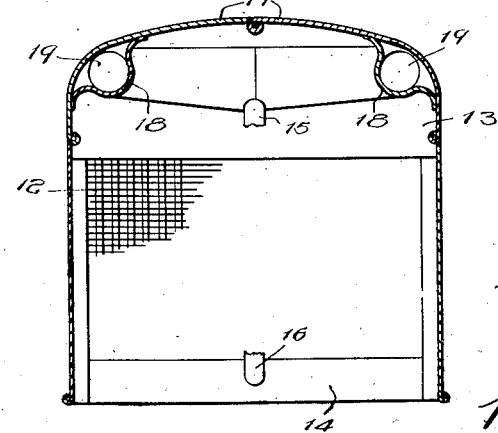

1,875,637

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

AUTOMOBILE HEATING AND VENTILATING APPARATUS

Application filed February 23, 1929. Serial No. 342,283.

My invention relates to combined heating and ventilating devices for automobiles and more particularly it relates to devices operable to convey heat radiated by the engine to the interior of a closed automobile through the medium of induced air currents.

One of the objects of the invention is the provision of improved means for utilizing heat radiated by the automobile engine and transferring such heat by convection into the interior of the automobile body by means of induced air currents.

A further object of the invention is the provision of an improved combined heating and ventilating apparatus for automobiles.

Another object of the invention is the provision of improved means for preheating air and causing induced currents of such preheated air to travel through the automobile body.

A still further object of the invention is the provision of improved means for controlling the volume of air thus travelling through the automobile body.

Still another object of the invention is the provision of a device of the class described which is simple in construction and can be economically manufactured.

Many other objects and advantages of the construction shown and described will be obvious to those skilled in the art from the disclosures herein given.

To this end my invention consists in the novel construction, arrangement and combination of parts herein shown and described, and more particularly pointed out in the claims.

In the drawings wherein like reference characters indicate like or corresponding parts:

Fig. 1 is a side elevational view of an automobile in which one embodiment of my invention is mounted;

Fig. 2 is a longitudinal sectional view drawn to a larger scale through the power plant of the automobile shown in Fig. 1;

Fig. 3 is a section along the line 3—3 of Fig. 2;

Fig. 4 is a section along the line 4—4 of Fig. 2;

Fig. 5 is a longitudinal sectional view through the power plant of an automobile equipped with an alternative embodiment of my invention; and Fig. 6 is a section along the line 6—6 of Fig. 5.

Referring now more particularly to the drawings, the numeral 10 generally designates an automobile having as a part of its power plant an engine 11. The engine 11 is cooled by a water circulating system comprising an outlet pipe 15 leading to a header tank 13 of a radiator 12. The system also includes a return pipe 16 connecting the engine 11 with a lower header tank 14 forming part of the radiator.

A portion of the heat transferred to the surrounding atmosphere by the radiator 12 is conveyed to the interior of the automobile body through a pair of ducts 19. The ducts 19 are formed by fastening plates 18 to the side walls of hood sections 17. The plates 18 may be fastened to the sections 17 by welding, brazing or any other process forming a substantially fluid-tight connection.

A transversely extending plate 22 is connected at its lower end to the upper mid-portion of the radiator 12 and extends rearwardly and upwardly to a connection with pipes 24. The plate 22 is so positioned as to deflect into the pipes 24 the air which has passed through the upper portion of the radiator 12. The pipes 24 open through the plate 22 at their forward ends and are positioned to register with the conduits 19 when the hood sections 17 are in their closed position. Pipes 20 are mounted in the front partition wall of the automobile body so as to also register with the conduits 19 when the hood sections are closed. The adjacent ends of the pipes 20 and 24 substantially abut plates 23 which form end walls for the duct 19. The ends of the pipes 20 and 24 are positioned sufficiently close to the plates 18 to form a substantially fluid-tight connection therewith and yet permit the hood section 17 on which the plate 18 is mounted to be swung open and closed without interference between the adjacent parts. When the hood sections 17 are closed, as shown in Fig. 3, the pipes 20 and 24 are in alignment with the ducts 19 and form therewith a continuous conduit connecting the air passages at the upper portion of the radiator 12 with the interior of the automobile body. The rear ends of the pipes 20 are provided with shutters 21 which have a hinged connection at their upper ends. The shutters 21 are adjustable to regulate the size of the outlet from the pipes 20.

It is obvious that the portion of the air passing through the upper end of radiator 12 will be deflected upwardly and laterally into and through the conduits thus formed and will enter the front end of the automobile body when the shutters 21 are open. The air thus circulating through and about the upper portion of the radiator 12 will be heated sufficiently to keep the interior of the automobile body comfortable.

The heated air after circulating through the automobile body passes out through a duct 34 positioned under the rear seat. A hingedly mounted shutter 35 is adapted to close the duct 34 when desired. The duct 34 discharges into a natural low pressure area which is induced by the motion of the car. Suction through the duct 34 is thereby set up which tends to draw air from the interior of the automobile and accelerates the circulation of air through the interior thereof.

An alternative embodiment of the invention is disclosed in Figs. 5 and 6 wherein I have provided a pair of oppositely positioned pipes 31 which conduct air from the upper portion of the radiator unit rearwardly into the interior of the automobile body. A transversely extending plate 30 deflects the air upwardly and laterally from the radiator 12 into pipes 31 which have their forward end opening through the plate. This construction differs from that previously described in that no portion of the pipes 31 forming the conduit is fastened to the hood sections and the hood can be opened without breaking the pipes 31. An adjustable shutter 32 is provided to control the volume of air that is permitted to pass through the pipe 31. An outlet duct (not shown) similar to that described in the embodiment shown in Fig. 1 may be provided to artificially accelerate heating and ventilating of the automobile body by setting up induced air currents. The air currents may also be induced artificially by providing an inspirator or ejector (not shown) connected with the duct 34.

Having thus described my invention, it is obvious that various modifications may be resorted to without departing from the spirit of the invention as defined in the claims forming a part hereof.

What I claim as new and desire to secure by Letters Patent is:

1. The combination with an automobile having a radiator forming an element of the cooling system for the engine of the automobile, a closed body and a hood extending from the body to the radiator, of means for heating the body, said means including an elongated member providing a chamber having an open side and openings respectively located adjacent the opposite ends of said member in a wall opposite said open side, said member being supported by and located adjacent the upper portion and extended transversely and communicating with air passages of the radiator, said automobile body having a wall with openings which communicate with the interior of said body, and conduits secured to the hood adapted to be moved into and out of communicating relation with said openings adjacent the opposite ends of said chambered member and said openings in said wall.

2. The combination with an automobile having a radiator forming an element of the cooling system for the engine of the automobile, a closed body and a hood extending from the body to the radiator, of means for heating the body, said means including a member providing a chamber having an open side and openings respectively located adjacent the opposite ends of said member in a wall opposite said open side supported by and located adjacent the upper portion and extended transversely and communicating with air passages of the radiator, said automobile body having a wall with openings which communicate with the interior of said body, and conduits secured to the hood adapted to be moved into and out of communicating relation with said openings of said chambered member and said openings in said wall, said chamber having an inclined wall for directing air into said chamber and toward said openings in said chamber.

In witness whereof, I hereunto subscribe my name this 20th day of February A. D., 1929.

ARTHUR B. MODINE.